US012750254B2

(12) United States Patent
Toillon et al.

(10) Patent No.: US 12,750,254 B2
(45) Date of Patent: Sep. 29, 2026

(54) TWO-WAY DATA COMMUNICATION OVER DUAL SINGLE-PAIR ETHERNET LINKS

(71) Applicant: Safran Electronics & Defense, Paris (FR)

(72) Inventors: Patrice Toillon, Moissy-Cramayel (FR); Thiebault Jeandon, Moissy-Cramayel (FR)

(73) Assignee: Safran Electronics & Defense, Paris (FR)

( * ) Notice: Subject to any disclaimer, the term of this patent is extended or adjusted under 35 U.S.C. 154(b) by 542 days.

(21) Appl. No.: 18/277,315

(22) PCT Filed: Feb. 15, 2022

(86) PCT No.: PCT/FR2022/050276

§ 371 (c)(1),
(2) Date: Aug. 15, 2023

(87) PCT Pub. No.: WO2022/175627

PCT Pub. Date: Aug. 25, 2022

(65) Prior Publication Data

US 2024/0129160 A1 Apr. 18, 2024

(30) Foreign Application Priority Data

Feb. 16, 2021 (FR) ....................................... 2101467

(51) Int. Cl.
*H04L 12/40* (2006.01)
*H04L 69/14* (2022.01)
*H04L 69/324* (2022.01)

(52) U.S. Cl.
CPC .......... *H04L 12/4013* (2013.01); *H04L 69/14* (2013.01); *H04L 69/324* (2013.01)

(58) Field of Classification Search
CPC ..... H04L 12/4013; H04L 67/12; H04L 69/14; H04L 69/324
See application file for complete search history.

(56) References Cited

U.S. PATENT DOCUMENTS 5,954,810 A * 9/1999 Toillon .................... H04L 12/44 709/250
6,873,630 B1 * 3/2005 Muller ...................... H04L 9/40 370/542

(Continued)

FOREIGN PATENT DOCUMENTS

EP 2 688 243 A1 1/2014
WO 00/70827 A2 11/2000

(Continued)

OTHER PUBLICATIONS

French preliminary search report issued for the priority application in FR 2101467 dated Oct. 8, 2021.

(Continued)

*Primary Examiner* — Ayman A Abaza
*Assistant Examiner* — Hooman Houshmand
(74) *Attorney, Agent, or Firm* — Sughrue Mion, PLLC

(57) ABSTRACT

A bidirectional data communication method for a bidirectional data communication system, in particular an embedded bidirectional data communication system, including one or more first communicating devices that implement a single-pair Ethernet protocol and one second communicating device that implements a single-pair Ethernet protocol and includes a second packet management module connected to a first physical link management module and to a second physical link management module.

12 Claims, 5 Drawing Sheets

(56) References Cited

U.S. PATENT DOCUMENTS

| | | | | |
|---|---|---|---|---|
| 2017/0277152 | A1* | 9/2017 | Liu | B64D 31/00 |
| 2019/0312777 | A1* | 10/2019 | Toillon | H04L 12/28 |
| 2021/0058268 | A1* | 2/2021 | Yu | H04L 1/0026 |

FOREIGN PATENT DOCUMENTS

| | | | |
|---|---|---|---|
| WO | 00/70827 | A3 | 11/2000 |
| WO | 2017/131762 | A1 | 8/2017 |

OTHER PUBLICATIONS

International Search Report and Written Opinion issued in application No. PCT/FR2022/050276 dated Jun. 1, 2022.

* cited by examiner

TWO-WAY DATA COMMUNICATION OVER DUAL SINGLE-PAIR ETHERNET LINKS

CROSS-REFERENCE TO RELATED APPLICATIONS

The present application is a National Stage entry of International Application No. PCT/FR2022/050276, filed on Feb. 15, 2022, which is based on and claims priority to French Application No. 2101467, filed on Feb. 16, 2021, the contents of each of which being herein incorporated by reference in their entireties.

TECHNICAL FIELD

The present disclosure relates to the field of data exchanges, particularly on board an aircraft, and aims more particularly a two-way communication method between different communicating devices of a two-way communication system, in particular an embedded two-way communication system.

BACKGROUND

Safety and reliability are major concerns in the design of an aircraft. Thus, it is essential to ensure the integrity of some types of measurement data, considered critical for piloting or involved in the management of the flight of the aircraft. These data include those relating to the positioning of the aircraft or those relating to the remaining amount of fuel.

These data are generally transmitted by sensors to computers, by means of an embedded network. Conversely, a computer can transmit a flight command to actuators, via such an embedded network.

To meet these needs, there is known a communication architecture that allows a plurality of equipment to emit and/or receive data via a trusted switched redundant Ethernet network, also known by the acronym AFDX™ for "Avionics Full Duplex Switched Ethernet".

Such equipment can be sensors transmitting measurement data to embedded computers, actuators receiving setpoint data from such computers or embedded computers communicating with each other.

The AFDX™ network is based on Ethernet technology using, for the physical layer or physical transceiver part, standard commercial components, also known by the acronym COTS for "Commercial Off-The-Shelf".

The AFDX™ network has been standardized in the ARINC 664 standard, which defines how ready-to-use commercial network components are used for aeronautical data networks, also known under the acronym ADN for "Aircraft Data Network". It is simply recalled that the AFDX™ network is full-duplex, deterministic and redundant.

Dual-channel, or Full Duplex, aeronautical communications are generally implemented based on 10/100Base-T Ethernet standards defining for an AFDX™ network, the use of a cable made up of 2 twisted pairs, for example of the quad type, for a Full Duplex operation, one twisted pair being used per direction of propagation, and of a contact adapted to such a cable configuration, for example of the quadrax type. Subsequently, this type of cable will be referred to as two pair cable.

On such a network, the physical data flow rate obtained is 10 Mbps or 100 Mbps per direction of propagation on the physical link, in particular on the twisted pair.

However, the volume of information and the overall need for performance of the flight control system or of the systems associated with the flight management being constantly increasing, it is necessary for the communication links to offer higher flow rates and lower latencies that the existing offer does not propose.

More recently, a type of Ethernet transceiver supporting new single pair Ethernet physical layers, such as 10Base-T1, has been developed, in particular for the automotive field, the 100Base-T1 or 1000Base-T1 allowing full duplex data transmission over a single twisted pair.

There is therefore a need to be able to use such transceivers in the current architecture of an embedded network of an aircraft in order to support more advanced physical layers, with the standard commercial wirings and connectors of an aircraft, in particular those of an AFDX™ network, in order to have a reliable, secure, higher flow rate and/or more compatible integrity data link.

SUMMARY

The disclosure meets such a need and proposes for this purpose a method allowing the use of Ethernet transceivers supporting the single pair Ethernet physical layers such as 10Base-T1, 100Base-T1 and 1000Base-T1 for data exchanges on board an aircraft.

According to a first aspect, this aim is achieved by a two-way data communication method of a two-way data communication system, in particular an embedded two-way data communication system comprising:

- at least a first communicating device configured to implement a single pair Ethernet protocol and comprising a first packet management module connected to a first physical link management module and to a second physical link management module, the first physical link management module and the second physical link management module being linked by a separate single pair link to a first common connector of the first communicating device, and
- a second communicating device configured to implement a single pair Ethernet protocol and comprising a second packet management module connected to a first physical link management module and to a second physical link management module, the first physical link management module and the second physical link management module being linked by a separate single pair link to a second common connector of the second communicating device, the first connector of the first communicating device being linked to the second connector of the second communicating device by an inter-device link, in particular a two pair link, characterized in that the method comprises:

- a step of receiving source data, in which the first packet management module of the first communicating device, respectively the second packet management module of the second communicating device, receives a source packet to be transmitted to the second communicating device, respectively to the first communicating device;
- a step of generating intermediate frames in which, in particular from each source packet or source frame, the first packet management module of the first communicating device, respectively the second packet management module of the second communicating device, generates:
  - a first intermediate frame comprising M data bits as a function of the N bits of the source packet to be transmitted, and a second intermediate frame comprising P data bits as a function of the N bits of the source packet to be transmitted;

a first step of transmitting intermediate frames, in which:

the first physical link management module of the first communicating device, respectively of the second communicating device, transmits the first intermediate frame on a first connector-module link, and the second physical link management module of the first communicating device, respectively of the second communicating device, transmits the second intermediate frame on a second connector-module link;

a step of receiving intermediate frames, in which:

the first physical link management module of the second communicating device, respectively of the first communicating device, receives the first intermediate frame on a first connector-module link, and the second physical link management module of the second communicating device, respectively of the first communicating device, receives the second intermediate frame on a second connector-module link;

a third step of transmitting intermediate frames, in which the first intermediate frame and the second intermediate frame are transmitted to the second packet management module of the second communicating device, respectively to the first packet management module of the first communicating device; and a step of reconstituting source data, in which the second packet management module of the second communicating device, respectively the first packet management module of the first communicating device, reconstitutes the N data bits of the source packet as a function of the M data bits of the first intermediate frame and of the P data bits of the second intermediate frame.

Advantageously, the proposed method makes it possible to fully use the current wirings and connectors in order to obtain communication interfaces with higher flow rate or greater integrity. Thus, in comparison with an AFDX™ data network, the method makes it possible to double the transmission flow rates.

The disclosure may advantageously completed by the following characteristics, taken individually or in any one of their technically possible combinations:

in which the M data bits of the first intermediate frame and the P data bits of the second intermediate frame are comprised between 1 and N, in particular equal to N, particularly comprised between 1 and N/2, in particular equal to N/2, N being the number of bits in the source packet in which the first intermediate frame and the second intermediate frame respectively include a verification-field calculated on all the bits of the first intermediate frame and the second intermediate frame, in which, in the step of reconstituting source data, the second packet management module of the second communicating device, respectively the first packet management module of the first communicating device, performs the processing of the verification-field of the first intermediate frame and of the second intermediate frame, in which the method comprises a step of verifying the transmission integrity by the check of the verification-field of the first intermediate frame and of the second intermediate frame, and in which the step of reconstituting source data being validated only if the step of verifying the transmission integrity is positive.

in which, in the reconstitution step, the second packet management module of the second communicating device, respectively the first packet management module of the first communicating device, performs the comparison of the data bits of the first intermediate frame and of the second intermediate frame, and in which the step of reconstituting source data being validated only if the comparison of the data bits of the first intermediate frame and of the second intermediate frame is consistent.

in which the first packet management module of the first communicating device, respectively the second packet management module of the second communicating device, includes at least a first media management module, and at least a first transfer module, respectively at least a second media management module, and at least a second transfer module, and in which the step of receiving source data includes:

a step of encapsulating the source packet in a source frame by the first media management module of the first communicating device, respectively the second media management module of the second communicating device, and the generation of the first intermediate frame and of the second intermediate frame as a function of the source frame by the first two-way transfer module of the first communicating device, respectively by the second transfer module of the second communicating device;

the step of reconstituting source data includes the reconstitution of the source frame by the second transfer module of the second communicating device, respectively by the first transfer module of the first communicating device; and the transmission of the source frame to the second media management module of the second communicating device, respectively, to the first media management module of the first communicating device.

in which, in the step of receiving intermediate frames, the reconstitution step is triggered only if the two frames are received by the first physical link management module and the second physical link management module of the second communicating device, respectively by the first physical link management module and the second physical link management module of the first communicating device, in a time window of predefined maximum duration.

in which the first packet management module of the first communicating device, respectively the second packet management module of the second communicating device, includes two first media management modules and a first transfer module, respectively two second media management modules and a second transfer module, and wherein:

the step of receiving source data includes:

a step of generating, by the first transfer module of the first communicating device, respectively by the second transfer module of the second communicating device:

a first intermediate data packet comprising M data bits extracted from the N bits of the source packet, and a second intermediate data packet comprising P data bits extracted from the N bits of said source packet, and a step of encapsulating the first intermediate packet in the first intermediate frame by one of the first media management modules of the first communicating device, respectively by one of the second media management modules of the second communicating device, and a step of encapsulating the second intermediate packet in the second intermediate frame by the other of the first media management modules of the first communicating device, respectively by the other of the second media management modules of the second communicating device;

the step of reconstituting source data includes, by the transfer module, the receipt of the first intermediate packet and of the second intermediate data packet respectively extracted from the first and the second intermediate frame, and the reconstitution of the source packet as a function of the first and of the second intermediate data packet.

in the step of receiving each of the intermediate packets by the second transfer module of the second communicating device, respectively by the first transfer module of the first communicating device, the reconstitution step is triggered only if the two intermediate packets are received within a time window of predefined maximum duration.

According to a second aspect, it is proposed an embedded two-way communication system, comprising at least a first communicating device and a second communicating device configured for the implementation of a method according to any of the preceding claims.

Of course, the different characteristics, variants and/or embodiments of the invention may be associated with each other in various combinations insofar as they are not incompatible or exclusive of each other.

DESCRIPTION OF THE DRAWINGS

The disclosure will be better understood and other characteristics and advantages will become apparent upon reading the following detailed description comprising embodiments given by way of illustration with reference to the appended figures, presented by way of non-limiting examples, which may be used to complete the understanding of the disclosure and the disclosure of its embodiment and, if necessary, contribute to its definition, on which.

It should be noted that, in all the figures, the structural and/or functional elements common to the different embodiments may have identical references. Thus, unless otherwise stated, such elements have identical structural, dimensional and material properties.

DETAILED DESCRIPTION

General Architecture

Figure 1:
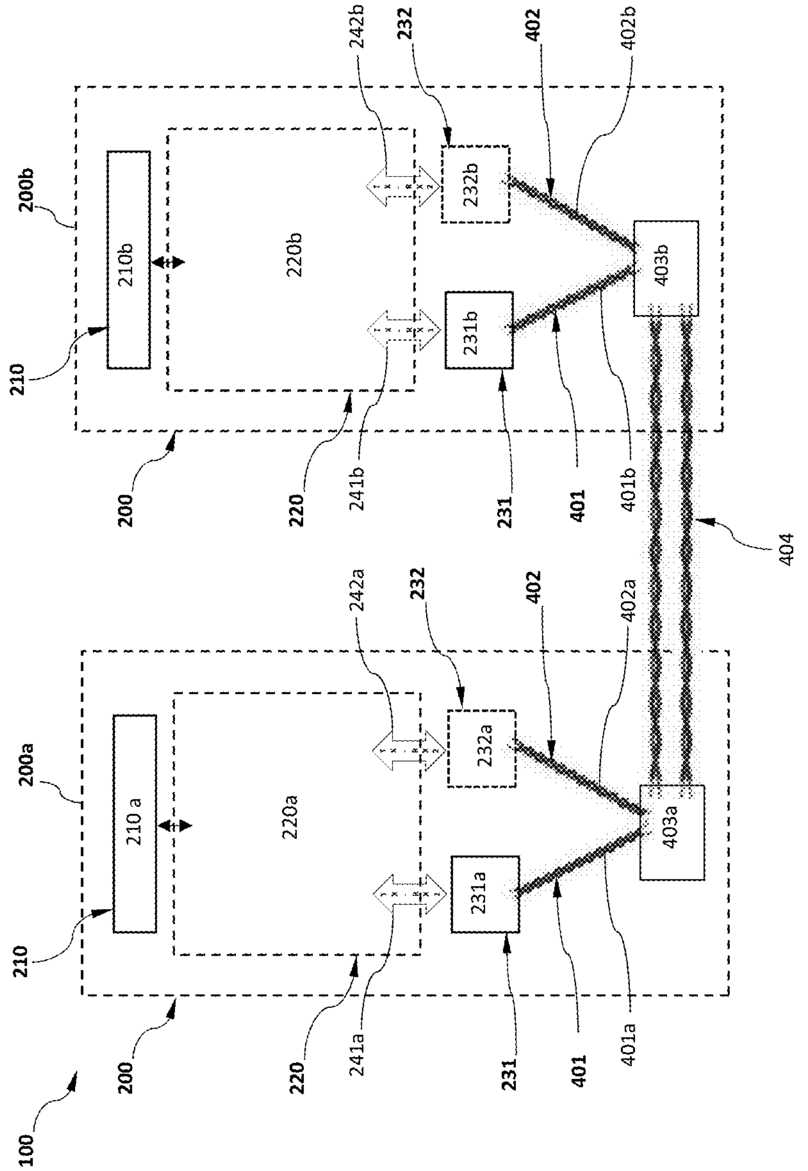
FIG. 1 schematically represents a two-way data communication system according to a first embodiment.

FIG. 1 schematically represents a two-way data communication system 100, particularly a two-way communication system embedded in an aircraft, according to a first embodiment.

The two-way data communication system 100 includes at least one communicating device 200, particularly a plurality of communicating devices, in particular a first communicating device 200*a* and a second communicating device 200*b*, connected together in order to exchange data via an Ethernet-type network.

The communicating device 200 includes a first physical link management module 231 and a second physical link management module 232, implementing a lower-level protocol, that is to say the physical layer of the OSI (Open Systems Interconnection) model according to the corresponding communication standard.

Particularly, the first communicating device 200*a* includes a first physical link management module 231*a* and a second physical link management module 232*a* and the second communicating device 200*b* includes a first physical link management module 231*b* and a second physical management module link 232*b*, respectively implementing a lower-level protocol.

The first physical link management module 231, respectively the second physical link management module 232, includes a transceiver supporting the single pair Ethernet standards, also referred to by the acronym SPE for “Single Pair Ethernet”, such as as 10Base-T1, 100Base-T1 or 1000Base-T1.

The transceiver is known, particularly in the automotive field. The single pair Ethernet standards, such as 10 Base-T1, 100Base-T1 or 1000Base-T1, are dedicated to transporting 10 Mbit/s, 100 Mbits/s or 1 Gbits/s Ethernet frames in full duplex and point-to-point over a single twisted pair, instead of the usual two or four pairs.

The first physical link management module 231, respectively the second physical link management module 232, includes a transceiving port (not represented) connected to a different physical Ethernet link, of the single pair link type, for example in the form of a twisted single pair cable.

The first physical link management module 231, respectively the second physical link management module 232, is responsible for generating and analyzing the physical signals which transit over their physical Ethernet links.

The communicating device 200 also includes a connector 403, particularly a first connector 403*a* of the first communicating device 200*a* and a second connector 403*b* of the second communicating device 200*b*.

The connector 403 of the communicating device 200 is linked to the first physical link management module 231 and to the second physical link management module 232 of the communicating device 200 by a first connector-module link 401 and a second connector-module link 402. The first connector-module link 401 and a second connector-module link 402 are preferably of the Ethernet type.

Specifically, the first connector 403*a* of the first communicating device 200*a* is linked to the first physical link management module 231*a* and to the second physical link management module 232*a* of the first communicating device 200*a* by a first connector-module link 401*a* and a second connector-module link 402*a*, preferably single pair links.

Similarly, the second connector 403*b* of the second communicating device 200*b* is linked to the first physical link management module 231*b* and to the second physical link management module 232*b* of the second communicating device 200*b* by a first connector-module link 401*b* and a second connector-module link 402*b*, preferably second single pair links.

The first communicating device 200*a* and the second communicating device 200*b* thus communicate with each other, in particular via the first physical link management module 231*a* and the second physical link management module 232*a* of the first communicating device 200*a* and the first physical link management module 231*b* and the second physical link management module 232*b* of the second communicating device 200*b*.

The connector 403*a* of the first communicating device 200*a* is linked to the connector 403*b* of the second communicating device 200*b*, by an inter-device link 404, particularly an inter-device link 404 of the two pair type, for example in the form of a twisted two pair cable, particularly expandable to four twisted pairs.

The frames emitted or received on the first physical link management module 231*a*, respectively the second physical link management module 232*a*, are transmitted quasi-simultaneously or with a small time lag between the first communicating device 200*a*, respectively the second communicating device 200*b*.

The communicating device 200 also includes a packet management module 220, particularly a first packet management module 220*a* of the first communicating device 200*a* and a second packet management module 220*b* of the second communicating device 200*b*.

The packet management module 220 is linked to the first physical link management module 231 and to the second physical link management module 232. This allows a two-way communication between the physical Ethernet layer and higher-level protocol layers 210.

More particularly, on the one hand, the first packet management module 220*a* of the first communicating device 200*a* is linked to the first physical link management module 231*a* and to the second physical link management module 232*a* of the first communicating device 200*a*. On the other hand, the second packet management module 220*b* of the second communicating device 200*b* is linked to the first physical link management module 231*b* and to the second physical link management module 232*b* of the second communicating device 200*b*.

Data buses 241 and 242 ensure the two-way transmission of data between the packet management module 220 and the first physical link management module 231 and the second physical link management module 232.

Thus, on the one hand, data buses 241*a* and 242*a* ensure the two-way transmission of data between the first packet management module 220*a* and the first physical link management module 231*a* and the second physical link management module 232*a* of the first communicating device 200*a*. On the other hand, data buses 241*b* and 242*b* ensure the two-way transmission of data between the second packet management module 220*b* and the first physical link management module 231*b* and the second physical link management module 232*b* of the second communicating device 200*b*.

The data bus 241*a*, 242*a*, 241*b* and 242*b* ensure the two-way data transmission generally meets the IEEE MII acronym for “Media Independent Interface” standard or RMII acronym for “Reduced Media Independent Interface”.

However, other standards may be used, such as GMII acronym for “Gigabit Media-Independent Interface”, RGMII acronym for “Reduced Gigabit Media Independent Interface”, SGMII acronym for “Serial Gigabit Media Independent Interface”, or the same.

The packet management module 220 includes a two-way transfer module and at least one media management module of the Media Access Control type, also known by the acronym MAC, which implements the Ethernet protocol whose architecture is detailed below in the description.

By extension, the transfer module is not limited to a two-way transfer module but can be a multi-way type transfer module.

In receipt, the signals transiting over the first connector-module link 401 and the second connector-module link 402 are analyzed and transformed into digital data by the first physical link management module 231 and the second physical link management module 232 of the communicating device 200.

Thus, the signals transiting over the first connector-module link 401*a* and the second connector-module link 402*a* of the first communicating device 200*a* are analyzed and transformed into digital data by the first physical link management module 231*a* and the second physical link management module 232*a* of the first communicating device 200*a*.

Similarly, the signals transiting over the first connector-module link 401*b* and the second connector-module link 402*b* of the second communicating device 200*b* are analyzed and transformed into digital data by the first physical link management module 231*b* and the second physical link management module 232*b* of the second communicating device 200*b*.

The digital data are then transmitted to the packet management module 220 of the communicating device 200, namely the first packet management module 220*a* of the first communicating device 200*a* and the second packet management module 220*b* of the second communicating device 200*b*, which analyzes them in the form of Ethernet packets or frames.

The communicating device 200 also comprises a higher-level protocol layer 210, namely a first higher-level protocol layer 210*a* of the first communicating device 200*a* and a second higher-level protocol layer 210*b* of the second communicating device 200*b*.

The Ethernet packets or frames analyzed by the packet management module 220 are then transmitted to the higher-level protocol layer 210, particularly the first higher-level protocol layer 210*a* and the second higher-level protocol layer 210*b*.

In emission, the packet management module 220, particularly the first packet management module 220*a* of the first communicating device 200*a* and the second packet management module 220*b* of the second communicating device 200*b*, receives the data to be transmitted from the higher-level protocol layer 210, particularly the first higher-level protocol layer 210*a* and the second higher-level protocol layer 210*b*, typically from an IP protocol stack in the form of IP packets.

The packet management module 220 assembles the Ethernet packets or frames conveying the IP data and transmits them to the first physical link management module 231 and to the second physical link management module 232, namely the first physical link management module 231*a* and the second physical link management module 232*a* of the first communicating device 200*a* and the first physical link management module 231*b* and the second physical link management module 232*b* of the second communicating device 200*b*, for their emission in the form of signals on the first connector-module link 401 and the second connector-module link 402, particularly on the first connector-module link 401*a* and a second connector-module link 402*a* of the first communicating device 200*a* and the first connector-module link 401*b* and the second connector-module link 402*b* of the second communicating device 200*b*.

The packet management module 220, particularly the first packet management module 220*a* of the first communicating device 200*a* and the second packet management module 220*b* of the second communicating device 220*b*, also includes a configuration interface to allow the configuration of the packet management module 220 in:

- a mode implementing a distribution/aggregation function, prioritizing the flow rate of the data transfers;
- a mode implementing a duplication/verification function, prioritizing the integrity of the data transfers; and/or
- a mode implementing a duplication/selection function prioritizing the availability of the data transfers additionally.

The packet management module 220 can be made in different forms, in a unitary or distributed manner, by means of hardware and/or software components. Usable hardware components are the programmable logic circuits, also referred to by the acronym FPGA for "Field-Programmable Gate Array", in the form of integrated circuits specific to an application or function, also referred to by the acronym ASIC for "Application Specific Integrated Circuit", or of microprocessors.

Thus, the transfer module and the media management module of the packet management module 220 can be implemented by means of the same component or on different components linked by a local communication link.

Figure 2:
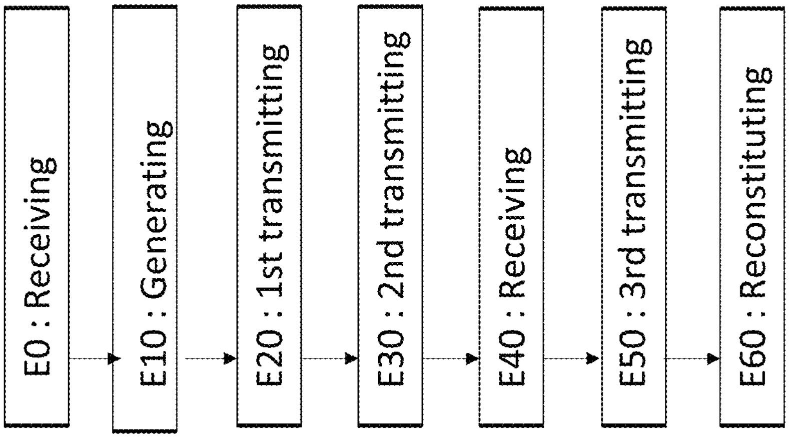
FIG. 2 represents a two-way communication method implemented by the two-way data communication system, FIG. 3 schematically represents a two-way data communication system according to a second embodiment.

Reference is now made to FIG. 2 which represents a two-way communication method implemented by the two-way data communication system 100.

For a better understanding, the method is described in the context of a transfer of data from the first communicating device 200*a* to the second communicating device 200*b*, the exchanges being two-way exchanges, of course the method can also be implemented simultaneously for the transfer of data from the second communicating device 200*b* to the first communicating device 200*a*.

The method implements, preferably successively, the following steps:

- a step of receiving source data E0, in which the first packet management module 220*a* of the first communicating device 200*a* receives a source packet or source data to be transmitted to the second communicating device 200*b;*
- a step of generating intermediate frames E10, in which the first packet management module 220*a* of the first communicating device 200*a* generates:
  - a first intermediate frame 510*a* comprising M data bits as a function of the N bits of the source packet to be transmitted, and
  - a second intermediate frame 510*b* comprising P data bits as a function of the N bits of the source packet to be transmitted, so that the N bits of the source packet are comprised in the association of the M data bits of the first intermediate frame 510*a* and of the P data bits of the second intermediate frame 510*b;*
- a first step of transmitting intermediate frames 20, in which:
  - the first physical link management module 231*a* of the first communicating device 200*a* transmits the first intermediate frame 510*a* on the first connector-module link 401*a* of the first communicating device 200*a*, and
  - the second physical link management module 232*a* of the first communicating device 200*a* transmits the second intermediate frame 510*b* on the second connector-module link 402*a* of the first communicating device 200*a;*
- a second step of transmitting intermediate frames E30, in which the first intermediate frame 510*a* and the second intermediate frame 510*b* are transmitted to the second communicating device 200*b* via the inter-device link 404, particularly by unitary physical propagation conducted on each respective twisted pair of the inter-device link 404;
- a step of receiving intermediate frames E40, in which:
  - the first physical link management module 231*b* of the second communicating device 200*b* receives the first intermediate frame 510*a* via the first connector-module link 401*b* of the second communicating device 200*b*, and
  - the second physical link management module 232*b* of the second communicating device 200*b* receives the second intermediate frame 510*b* via the second connector-module link 402*b* of the second communicating device 200*b;*
- a third step of transmitting intermediate frames E50, in which the first intermediate frame 510*a* and the second intermediate frame 510*b* are transmitted to the second packet management module 220*b* of the second communicating device 200*b*; and
- a step of reconstituting source data E60, in which the second packet management module 220*b* of the second communicating device 200*b* reconstitutes the N data bits of the source packet as a function of the M data bits of the first intermediate frame 510*a* and the P data bits of the second intermediate frame 510*b*, particularly, by extension, of all of the intermediate frames.

As part of a transfer of data from the second communicating device 200*b* to the first communicating device 200*a*, the method implements, preferably successively, the following steps:

- a step of receiving source data E0, in which the second packet management module 220*b* of the second communicating device 200*b* receives a source packet to be transmitted to the first communicating device 200*a;*
- a step of generating intermediate frames E10, in which the second packet management module 220*b* of the second communicating device 200*b* generates:
  - a first intermediate frame 510*a* comprising M data bits as a function of the N bits of the source packet to be transmitted, and
  - a second intermediate frame 510*b* comprising P data bits as a function of the N bits of the source packet, so that the N bits of the source packet are comprised in the association of the M data bits of the first intermediate frame 510*a* and the P data bits of the second intermediate frame 510*b;*
- a first step of transmitting intermediate frames E20, in which:
  - the first physical link management module 231*b* of the second communicating device 200*b* transmits the first intermediate frame 510*a* on the first connector-module link 401*b* of the second communicating device 200*b*, and
  - the second physical link management module 232*b* of the second communicating device 200*b* transmits the second intermediate frame 510*b* on the second connector-module link 402*b* of the second communicating device 200*b;* a second step of transmitting intermediate frames E30, in which the first intermediate frame and the second intermediate frame are transmitted to the first communicating device 200*a* via the inter-device link 404;

a step of receiving intermediate frames E40, in which:

the first physical link management module 231*a* of the first communicating device 200*a* receives the first intermediate frame 510*a* via the first connector-module link 401*a* of the first communicating device 200*a*, and the second physical link management module 232*a* of the first communicating device 200*a* receives the second intermediate frame 510*b* via the second connector-module link 402*a* of the first communicating device 200*a;* a third step of transmitting intermediate frames E50, in which the first intermediate frame 510*a* and the second intermediate frame 510*b* are transmitted to the first packet management module 220*a* of the first communicating device 200*a*; and a step of reconstituting source data E60, in which the first packet management module 220*b* of the first communicating device 200*a* reconstitutes the N data bits of the source packet as a function of the M data bits of the first intermediate frame 510*a* and the P data bits of the second intermediate frame 510*b*, particularly, by extension, of all the intermediate frames.

MonoMac Architecture

Figure 3:
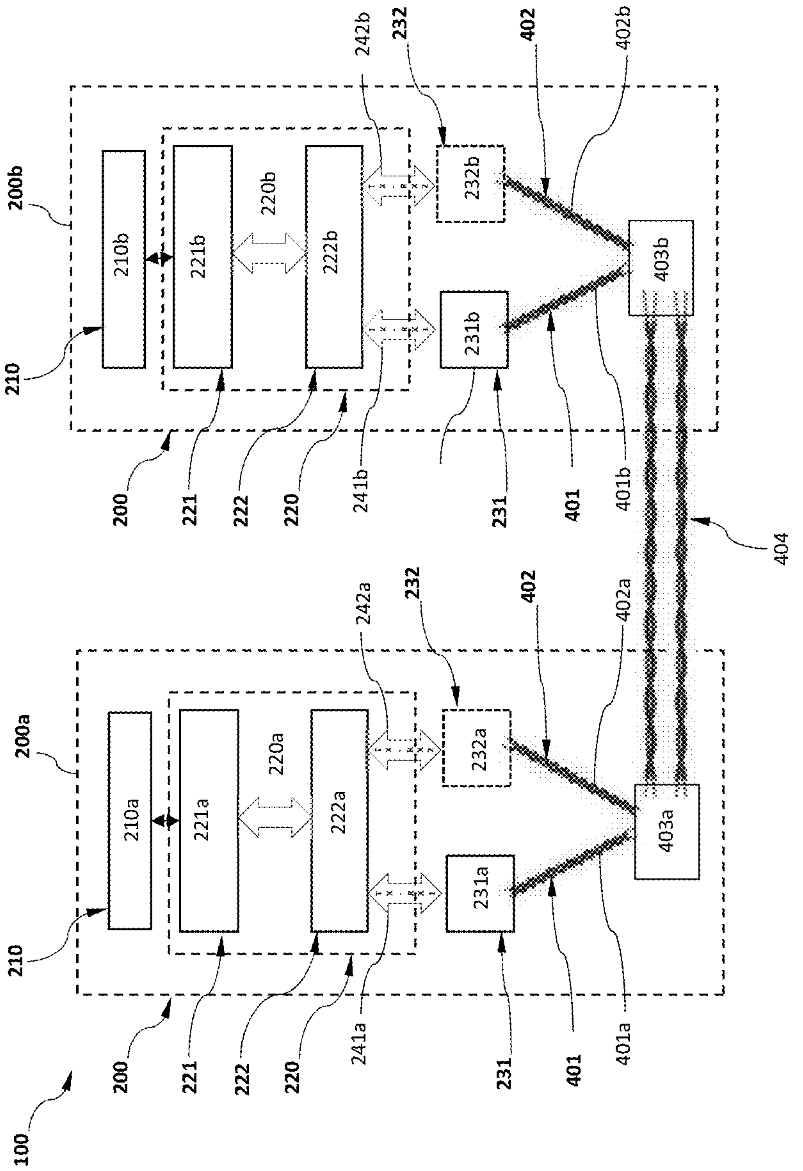

FIG. 3 schematically represents a two-way data communication system according to a second embodiment. More particularly, the second embodiment differs by the architecture of the packet management module 220 of the communicating device 200.

In the embodiment presented in FIG. 3, the packet management module 220 of the communicating device 200 includes at least one transfer module 222, in particular a multi-way transfer module 222 and particularly a two-way transfer module 22, and at least one media management module 221, in particular a media management module 221 of the MAC type, which implements the Ethernet protocol.

Specifically, on the one hand, the first packet management module 220*a* of the first communicating device 200*a* includes at least a first transfer module 222*a* and at least a first media management module 221*a*, in particular of the MAC type, which implements the ethernet protocol. On the other hand, the second packet management module 220*b* of the second communicating device 200*b* includes at least a second transfer module 222*b* and at least a second media management module 221*b*, in particular of the MAC type, which implements the Ethernet protocol.

The media management module 221 includes means for two-way communication with the higher-level protocol layer 210 to emit/receive data packets.

Furthermore, the media management module 221 and the transfer module 222 are linked by a specific bus ensuring the two-way transmission of data frames.

The first transfer module 222*a* of the first communicating device 200*a* is linked by two buses, particularly separate and independent and by extension several buses, ensuring two-way transmission with the first physical link management module 231*a* and the second physical link management module 232*a* of the first communicating device 200*a* to emit/receive frames.

Flow Rate Priority

In relation to FIG. 2 previously described, the communication method is such that the transfer module 222 of the communicating device 200, particularly the first transfer module 222*a* of the first communicating device 200*a* and/or the second transfer module 222*b* of the second communicating device 200*b*, is in a configuration mode implementing a distribution/aggregation function prioritizing the data transfer flow rate.

The step of receiving source data E0 includes the receipt, by the media management module 221 of the communicating device 200, of the source packet to be transmitted, emitted by the higher-level protocol layer 210.

In the step of generating intermediate frames E10, the media management module 221 of the communicating device 200 generates an exchanged data frame encapsulating the data packet and transmits the exchanged data frame to the transfer module 222.

Figure 4A:
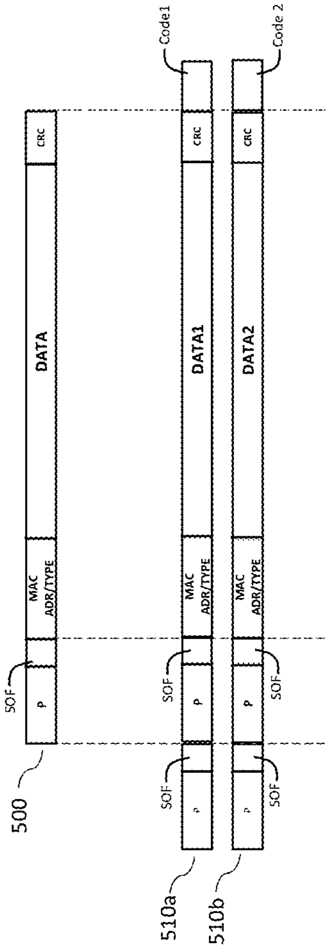
FIG. 4A shows a first example of data frames exchanged by the data exchange method according to the invention.
Figure 4B:
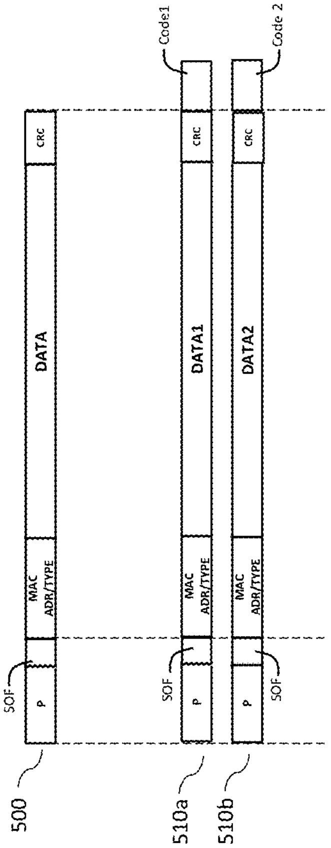
FIG. 4B shows a first example of data frames exchanged by the data exchange method according to the invention, and FIG. 5 schematically represents a two-way data communication system according to a third embodiment.

As illustrated in FIGS. 4*a* and 4*b*, the exchanged data frame or source frame is referenced 500. The exchanged data frame 500 or source frame 500 is in the typical standardized format, in particular meeting the IEEE 802.3 standard, and includes:

a preamble-field P, for example on 7 bytes, able to allow a synchronization of the signal, a delimiter-field SOF, for example on 1 byte, able to indicate a start of the information of the exchanged data frame 500, an address-field ADR, for example on 2*6=12 bytes, able to define a Destination MAC address and a Source MAC address, a type-field TYPE, for example on 2 bytes, able to define a protocol of the higher-level protocol layer 210, a data-field DATA, able to contain information from the exchanged data frame 500, and a verification-field CRC, for example on 4 bytes, able to define a cyclic redundancy code, also referred to by the acronym CRC for "Cyclic Redundancy Check".

The data-field DATA has a maximum size equal to the maximum size of a packet, also referred to by the acronym MTU for "Maximum Transmission Unit" which, by default, is equal to 1,500 bytes. Alternatively, padding bits are added to reach a size of 46 bytes.

The transfer module 222 of the communicating device 200 then performs the generation of the first intermediate frame 510*a* and of the second intermediate frame 510*b* in which the N bits of the data field of the source packet are distributed. The first intermediate frame 510*a* and the second intermediate frame 510*b* are intended to be emitted on a separate physical link, namely the first connector-module link 401 and the second connector-module link 402.

The transfer module 222 of the communicating device 200 performs the distribution of the N bits of the data field of the source packet of the exchanged data frame 500 between the first intermediate frame 510*a* and the second intermediate frame 510*b* by a balanced distribution, in particular from a basic law or from another predefined law.

The N bits of the data field of the source packet of the exchanged data frame 500 can be distributed in the data-fields DATA of the first intermediate frame 510*a* and the second intermediate frame 510*b* by p-tuples of bits, with p comprised between 1 and n/2. Padding bits can also be added to reach 46 bytes.

The transfer module 222 also performs an encapsulation, that is to say in the present case a distribution, in the first intermediate frame 510*a* and the second intermediate frame 510*b*, of the address-field ADR, of the type-field TYPE and of the verification-field CRC.

The transfer module 222 can also encapsulate, or distribute, the preamble-field Pet the delimiter-field SOF of the exchanged data frame 500.

Alternatively, the transfer module 222 can also:

duplicate the preamble-field P and the delimiter-field SOF of the exchanged data frame 500 for each of the first intermediate frame 510*a* and of the second intermediate frame 510*b*; and/or generate a new sequence of bits for the preamble-field P and a new delimiter-field SOF, which preferably will not be reduced; and/or generate a new verification-field CRC for each of the first intermediate frame 510*a* and of the second intermediate frame 510*b*.

In such configurations, the preamble-field P can be said to be "reduced" because it is composed of a number of bits lower than the number of bits of the preamble-field P of the exchanged frame data 500. However, in these same configurations, the new delimiter-field SOF will not be "reduced".

The integrity of the data on each of the first intermediate frame 510*a* and of the second intermediate frame 510*b* is ensured by the verification-field CRC which makes it possible, through a calculation, to validate the data transmitted in the exchanged data frame 500.

The verification-field CRC is positioned at the end of the exchanged data frame 500 and corresponds to all of the bits of the intermediate frame, respectively of the first intermediate frame 510*a* and of the second intermediate frame 510*b*.

Advantageously, the verification-field calculation CRC is based on a polynomial Cyclic Redundancy Check of degree 32, in particular meeting the CRC-32-IEEE standard. Thus, the calculation of the verification-field CRC for the first intermediate frame 510*a* and the second intermediate frame 510*b* may be based on the identical generator polynomials or the generator polynomials may be different for the first intermediate frame 510*a* and the second intermediate frame 510*b*.

In the first step of transmitting intermediate frames E20, the transfer module 222 of the communicating device 200 performs the transmission of the first intermediate frame 510*a* and of the second intermediate frame 510*b*, in particular via respectively the first physical link management module 231 and the second physical link management module 232 of the communicating device 200.

To this end, each of the first intermediate frame 510*a* and of the second intermediate frame 510*b* is emitted on a separate physical link of the communicating device 200, namely the first connector-module link 401 and the second connector-module link 402 of the communicating device 200.

In the second step of transmitting intermediate frames E30, the first intermediate frame 510*a* and the second intermediate frame 510*b* are transmitted to another communicating device 200, respectively the second communicating device 200*b* if the step of generating intermediate frames E10 is carried out by the first communicating device 200*a*, or the first communicating device 200*a* if the step of generating intermediate frames E10 is carried out by the second communicating device 200*b*, via the inter-device link 404.

Each of the first intermediate frame 510*a* and of the second intermediate frame 510*b* is emitted on a separate physical link.

The first intermediate frame 510*a* and the second intermediate frame 510*b* can be transmitted simultaneously or with a small time lag, comprised in a given time window.

In the step of receiving intermediate frames E40, the first intermediate frame 510*a* and the second intermediate frame 510*b* are received on the physical links of the other communicating device 200, respectively the second communicating device 200*b* if the step of generating intermediate frames E10 is carried out by the first communicating device 200*a*, or the first communicating device 200*a* if the step of generating intermediate frames E10 is carried out by the second communicating device 200*b*, via the inter-device link 404.

The first intermediate frame 510*a* and the second intermediate frame 510*b* can be received simultaneously or with a small time lag, comprised in a given time window.

In the third step of transmitting intermediate frames E50, the first intermediate frame 510*a* and the second intermediate frame 510*b* are transmitted to the transfer module 222 of the other communicating device 200, particularly to the second transfer module 222*b* of the second communicating device 200*b*.

In the step of reconstituting source data E60, the transfer module 222 of the communicating device 200, particularly the second transfer module 222*b* of the second communicating device 200*b*, performs the aggregation of the first intermediate frame 510*a* and of the second intermediate frame 510*b* received to reconstitute the source frame.

In the step of reconstituting source data E60, on receipt of a first intermediate frame 510*a*, the transfer module 222 triggers a time window of predefined maximum duration, constituting a receiving Delta T, in which the second intermediate frame 510*b*, that is to say the late frame, must be received.

If the second intermediate frame 510*b* is not received after the time window of predefined maximum duration has elapsed, the step of reconstituting source data E60 is not carried out and the source frame 500 is not reconstituted. Alternatively, the first received frame can also be the second intermediate frame 510*b*, the triggering of the receiving time window taking place on receipt of the second intermediate frame 510*b*.

The reconstitution or aggregation function returns to awaiting receipt of the group of the following first intermediate frame 510*a* and second intermediate frame 510*b*.

The time window of predefined maximum duration can be set on the detection of the delimiter-field SOF in the first intermediate frame 510*a* and in the second intermediate frame 510*b*.

To perform the aggregation or the reconstitution, the transfer module 222 of the communicating device 200 implements an aggregation law in correspondence with the distribution law used for the distribution of the bits of the source packet in the step of generating intermediate frames E10 to reconstitute the source frame 500.

The data of the source packet are reconstituted from the data of the first intermediate frame 510*a* and of the second intermediate frame 510*b*. The other fields of the source frame 500 are also reconstituted.

The first intermediate frame 510*a* and the second intermediate frame 510*b* are also validated by the dedicated verification-field CRC. In case of inconsistency, the reconstituted source frame 500 is not validated.

If the reconstituted source frame 500 is validated, it is then transmitted to the media management module 221 of the communicating device 200 which transmits the source packet to the higher-level protocol layer 210.

The description which has just been given is such that the step of receiving source data E0 and the step of generating intermediate frames E10 are carried out by the first communicating device 200*a*. However, what has just been described can be mutually transposed in an analogous manner if the step of receiving source data E0 and the step of generating intermediate frames E10 are carried out by the second communicating device 200*b*, particularly simultaneously or non-simultaneously.

Integrity Priority

In relation to FIG. 2 previously described, the communication method is now described in which the transfer module 222 of the communicating device 200 is in a configuration mode implementing a duplication/verification function prioritizing the integrity of the data transfers, as well as the improvement of availability according to certain versions.

The step of receiving source data E0 includes the receipt, by the media management module 221 of the communicating device 200, of the source packet to be transmitted, emitted by the higher-level protocol layer 210.

The media management module 221 generates the source frame 500 encapsulating the data packet and transmits the source frame 500 to the transfer module 222.

In the step of generating intermediate frames E10, the transfer module 222 of the communicating device 200 performs the generation of the first intermediate frame 510*a* and the second intermediate frame 510*b* in which the N-bits of the data-field are duplicated. Each of the first intermediate frame 510*a* and of the second intermediate frame 510*b* is intended to be emitted on a separate physical link, namely the first connector-module link 401 and the second connector-module link 402.

The transfer module 222 also performs the encapsulation, that is to say in the present case a duplication, in the first intermediate frame 510*a* and the second intermediate frame 510*b*, of the address-fields ADR and of the type-field TYPE and generates for each the first intermediate frame 510*a* and of the second intermediate frame 510*b*, a new sequence of bits for the preamble-field P. This preamble-field P is said to be "reduced" because it is composed of a number of bits lower than the number of bits of the preamble of the source frame 500.

Alternatively, the preamble-field P can be kept the same, this will be to the detriment of the size of the first intermediate frame 510*a* and of the second intermediate frame 510*b* which will be increased by the size of the redundancy sequence.

The transfer module 222 also generates a new delimiter-field SOF and a correcting code for the first intermediate frame 510*a* and the second intermediate frame 510*b*.

Preferably, the new delimiter-field SOF has a value identical to the source delimiter-field SOF.

Preferably, a redundancy sequence is added or associated with the correcting code.

The correcting code is based on the redundancy and is intended to correct the transmission errors of the first intermediate frame 510*a* and of the second intermediate frame 510*b*.

To this end, the correcting code makes it possible to detect and correct or only detect the transmission errors according to the choice of the redundancy sequence, according to the type of associated polynomial, the dimension, etc.

The redundancy sequence is associated with the code. Thus, the correcting code is located at the end of the frame and corresponds to all of the bits of the frame.

The calculation of the code, including in particular the redundancy sequence itself excluding the preamble-field P and the delimiter-field SOF, is for example based on a Reed-Solomon code for the detection and correction of erroneous bits or on a CRC type code for the detection of erroneous bits. The calculation of the verification-field CRC for the first intermediate frame 510*a* and the second intermediate frame 510*b* can be based on the formal polynomial.

Particularly, the formal polynomial may be different for the first intermediate frame 510*a* and the second intermediate frame 510*b*.

In the first step of transmitting intermediate frames E20, the transfer module 222 performs the transmission of the first intermediate frame 510*a* and of the second intermediate frame 510*b*. To this end, each of the first intermediate frame 510*a* and of the second intermediate frame 510*b* is emitted on a physical link of the communicating device 200, namely the first connector-module link 401 and the second connector-module link 402 of the communicating device 200.

In the second step of transmitting intermediate frames E30, the first intermediate frame 510*a* and the second intermediate frame 510*b* are transmitted to the second communicating device 200*b*, if the step of generating intermediate frames E10 is carried out by the first communicating device 200*a*, or to the first communicating device 200*a*, if the step of generating intermediate frames E10 is carried out by the second communicating device 200*b*, via the inter-device link 404.

The first intermediate frame 510*a* and the second intermediate frame 510*b* can be transmitted simultaneously or with a small time lag, comprised in a given time window.

However, in the case of the integrity capability, a low time lag on emission, that is to say a time lag of X bits between the transmission of the intermediate frames can globally improve the integrity and availability. Indeed, the disturbance does not apply to the same position of a sequence of bits on each of the intermediate frames.

The intermediate frames can be received simultaneously or with a small time lag, comprised in a given time window.

In the step of receiving intermediate frames E40, the first intermediate frame 510*a* and the second intermediate frame 510*b* are received on the physical links of the second communicating device 200*b*.

The first intermediate frame 510*a* and the second intermediate frame 510*b* can be received simultaneously or with a small time lag, comprised in a given time window.

In the third step of transmitting intermediate frames E50, the transmitted first intermediate frame 510*a* and second intermediate frame 510*b* are transmitted to the transfer module 222 of the second communicating device 200.

The intermediate frames can be received simultaneously or with a small time lag, comprised in a given time window.

In the third step of transmitting intermediate frames E50, the transfer module 222 of the communicating device 200, particularly the second transfer module 222*b* of the second communicating device 200*b*, performs a verification of the integrity of the first intermediate frame 510*a* and of the second intermediate frame 510*b* received.

The third step of transmitting intermediate frames E50 could further comprise a correction of erroneous bits according to the type of code of a dedicated redundancy sequence.

At the third step of transmitting intermediate frames E50, on receipt of a first frame 510*a*, the transfer module 222 of the second communicating device 200, particularly the second transfer module 222*b* of the second communicating device 200*b*, triggers a time window of a predefined maximum duration, constituting a receiving Delta T, in which the second intermediate frame 510*b*, that is to say the late frame, must be received.

If the second intermediate frame 510*b* is not received after the time window of predefined maximum duration has elapsed, the third step of transmitting intermediate frames E50, then also consisting of a verification step, is not carried out and the source frame 500 is not reconstituted.

The integrity verification function could include the correction of erroneous bits. Consequently, it returns to awaiting receipt of the group of the following first intermediate frame 510*a* and second intermediate frame 510*b*.

The time window of predefined maximum duration can be set on the detection of the delimiter-field SOF in the first intermediate frame 510*a* and in the second intermediate frame 510*b*.

To perform the verification of the integrity, the transfer module 222 performs the checking, from the redundancy sequence and according to the selected correcting code, the detection and the correction of erroneous bits or the simple detection of erroneous bits, for the first intermediate frame 510*a* and for the second intermediate frame 510*b*.

In case of inconsistency, the intermediate frame is not validated.

If the first intermediate frame 510*a* and the second intermediate frame 510*b* are not validated, the source frame 500 is not restored.

If the first intermediate frame 510*a* or the second intermediate frame 510*b* is validated, the source frame 500 can be restored, from the first intermediate frame 510*a* validated as a function of the integrity criteria previously applied with restoration of a complete preamble-field P or, by predefined choice, from the first intermediate frame 510*a* if the first intermediate frame 510*a* and the second intermediate frame 510*b* are simultaneously validated.

Furthermore, in particular in the case of enhanced integrity, a comparison of the data, particularly bit by bit, of the first intermediate frame 510*a* and of the second intermediate frame 510*b* is carried out. In case of inconsistency, the integrity verification is not validated and the source frame 500 is not validated.

If the source frame 500 is validated, it is then transmitted to the media management module 221 of the communicating device 200, particularly to the second media management module 221*b* of the second communicating device 200*b*, which transmits the source packet to the higher-level protocol layer 210, namely the second higher-level protocol layer 210*b*.

The description which has just been made is such that the step of receiving source data E0 and the step of generating intermediate frames E10 are carried out by the first communicating device 200*a*. However, what has just been described can be mutually transposed in an analogous manner if the step of receiving source data E0 and the step of generating intermediate frames E10 are carried out by the second communicating device 200*b*, particularly simultaneously or non-simultaneously.

DualMac Architecture

Figure 5:
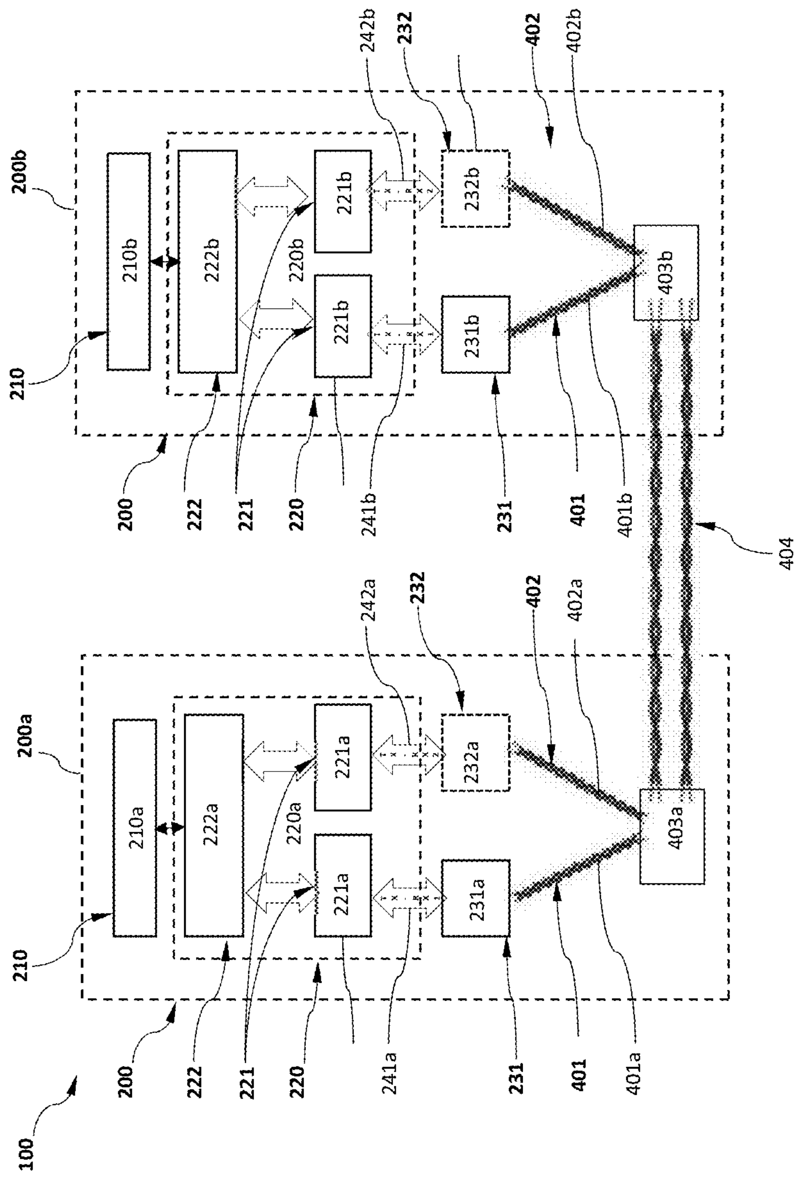

FIG. 5 schematically represents a two-way data communication system according to a third embodiment. More particularly, the third embodiment differs by the architecture of the packet management module 220 of the communicating device 200.

In the embodiment presented in FIG. 5, the transfer module 222 of the packet management module 220 of the communicating device 200 includes means for two-way communication with the higher-level protocol layer 210 to emit/receive data packets.

Specifically, the first transfer module 222*a* of the first packet management module 220*a* of the first communicating device 200*a* includes means for two-way communication with the first higher-level protocol layer 210*a* to emit/receive data packets. Furthermore, the second transfer module 222*b* of the second packet management module 220*b* of the second communicating device 200*b* includes means for two-way communication with the second higher-level protocol layer 210*b* to emit/receive data packets.

In addition, the packet management module 220 of the communicating device 200 also includes two media management modules 221, particularly two first media management modules 221*a* of the first communicating device 200*a* and two second media management modules 221*b* of the second communicating device 200*b*.

The two media management modules 221 include means for two-way communication with the first physical link management module 231 and the second physical link management module 232 to emit/receive frames.

The two media management modules 221 and the transfer module 222 are linked by a specific bus ensuring the two-way transmission of data frames.

Specifically, the first two media management modules 221*a* and the first transfer module 222*a* of the first communicating device 200*a* are linked by a specific bus ensuring the two-way transmission of data frames. Similarly, the two second media management modules 221*b* and the second transfer module 222*b* are linked by a specific bus ensuring the two-way transmission of data frames.

Flow Rate Priority

In relation to FIG. 2 previously described, the communication method is such that the transfer module 222 of the communicating device 200, particularly the first transfer module 222*a* of the first communicating device 200*a* and the second transfer module 222*b* of the second communicating device 200*b*, is in a configuration mode implementing a distribution/aggregation function prioritizing the flow rate of the data transfers.

The source data receiving step E0 includes the receipt by the transfer module 222 of the communicating device 200 of a source packet to be transmitted emitted by the higher-level protocol layer 210.

In the step of generating intermediate frames E10, the transfer module 222 of the communicating device 200 performs the distribution of the N bits of the data field of the source packet between a first intermediate data packet, or first intermediate frame, and a second intermediate data packet, or second intermediate frame, by a balanced distribution, in particular from a basic law or from another predefined law.

The N bits of the data field of the source packet or source data can be distributed in the first intermediate data packet and the second intermediate data packet by n-tuples of bits.

In the first step of transmitting intermediate frames E20, the transfer module 222 of the communicating device 200 performs the transmission of the first intermediate data packet and the second intermediate data packet generated respectively to the two media management modules 221 of the communicating device 200.

The two media management modules 221 of the communicating device 200 then respectively generate a frame in the typical standardized format, responding in particular to the IEEE 802.3 standard, encapsulating the intermediate data packet received.

Consequently, the two media management modules 221 of the communicating device 200 transmit the two frames in the typical standardized format via respectively the first physical link management module 231 and the second physical link management module 232 of the communicating device 200.

Particularly, the first two media management modules 221*a* of the first communicating device 200*a* transmit the two frames in the typical standardized format via respectively the first physical link management module 231*a* and the second physical link management module 232*a* of the first communicating device 200*a*.

To this end, the two frames in the typical standardized format are emitted on a separate physical link of the communicating device 200, namely the first connector-module link 401*a* and the second connector-module link 402*a* of the first communicating device 200*a*.

In the second step of transmitting intermediate frames E30, the two frames in the typical standardized format are transmitted to another communicating device, respectively the second communicating device 200*b* if the step of generating intermediate frames E10 is carried out by the first communicating device 200*a*, or the first communicating device 200*a* if the step of generating intermediate frames E10 is carried out by the second communicating device 200*b*, via the inter-device link 404.

Each of the frames in the typical standardized format is emitted on a separate physical link.

The two frames in the typical standardized format can be transmitted simultaneously or with a small time lag, comprised in a given time window.

In the step of receiving intermediate frames E40, the two frames in the typical standardized format are received on the physical links of the other communicating device 200, respectively the second communicating device 200*b* if the step of generating intermediate frames E10 is carried out by the first communicating device 200*a*, or the first communicating device 200*a* if the step of generating intermediate frames E10 is carried out by the second communicating device 200*b*, via the inter-device link 404.

Particularly, the first physical link management module 231*b* of the second communicating device 200*b* receives one of the two frames in the typical standardized format via the first connector-module link 401*b* of the second communicating device 200*b*, and the second physical link management module 232*b* of the second communicating device 200*b* receives the other of the two frames in the typical standardized format via the second connector-module link 402*b* of the second communicating device 200*b*.

In the third step of transmitting intermediate frames E50, the two frames in the typical standardized format are transmitted to each media management module 221 of the other communicating device 200, particularly to the two second media management modules 221*b* of the second communicating device 200*b*.

Consequently, during the third step of transmitting intermediate frames E50, each media management module 221 of the other communicating device 200 respectively each transmits the intermediate packets extracted from the intermediate frames received to the transfer module 222 of the other communicating device 200, particularly the second transfer module 222*b* of the second communicating device 200*b*.

In the step of reconstituting source data E60, the transfer module 222 of the communicating device 200 performs the aggregation of the intermediate packets received to reconstitute the source frame.

In the step of reconstituting source data E60, on receipt of the first of the two frames in the typical standardized format, the transfer module 222, particularly the second transfer module 222*b* of the second communicating device 200*b*, triggers a time window of predefined maximum duration, constituting a receiving Delta T, in which the second of the two frames in the typical standardized format, that is to say of the late frame, must be received.

If the second of the two frames in the typical standardized format is not received after the time window of predefined maximum duration has elapsed, the step of reconstituting source data E60 is not carried out and the source frame 500 or the source data 500 is not reconstituted.

The aggregation function returns to awaiting receipt of the group of the next two frames in the typical standardized format.

The time window of predefined maximum duration can be set on the detection of the delimiter-field SOF in the first intermediate frame 510*a* and in the second intermediate frame 510*b*.

To perform the aggregation, the transfer module 222 of the communicating device 200, particularly the second transfer module 222*b* of the second communicating device 200*b*, implements an aggregation law in correspondence with the distribution law used for the distribution of the bits of the source packet in the step of generating intermediate frames E10 to reconstitute the source frame 500 or the source data 500.

The data of the source packet are reconstituted from the data of the two frames in the typical standardized format. If the source frame 500, or the source data 500, reconstituted is validated, the source packet is then transmitted to the higher-level protocol layer 210, namely the second higher-level protocol layer 210*b*.

The description which has just been made is such that the step of receiving source data E0 and the step of generating intermediate frames E10 are carried out by the first communicating device 200*a*. However, what has just been described can be mutually transposed in an analogous manner if the step of receiving source data E0 and the step of generating intermediate frames E10 are carried out by the second communicating device 200*b*, particularly simultaneously or non-simultaneously.

Integrity Priority

In relation to FIG. 2 previously described, the communication method is now described in which the transfer module 222 of the communicating device 200 is in a configuration mode implementing a duplication/verification function prioritizing the integrity of the data transfers, as well as the improvement of the availability according to some versions.

The step of receiving source data E0 includes the receipt by the transfer module 222 of the communicating device 200, particularly the first transfer module 222*a* of the first communicating device 200*a*, of a source packet to be transmitted, emitted by the upper protocol layers 210, particularly the first higher-level protocol layer 210*a*.

In the step of generating intermediate frames E10, the two-way transfer module 222 of the communicating device 200 performs the duplication of the N bits of the data field of the source packet between a first intermediate data packet or first intermediate frame, and a second intermediate data packet or second intermediate frame.

In the first step of transmitting intermediate frames E20, the transfer module 222 of the communicating device 200 performs the transmission of the respectively generated first intermediate data packet and second intermediate data packet to the two media management modules 221 of the communicating device 200.

The two media management modules 221 of the communicating device 200 then respectively generate a frame in the typical standardized format, responding in particular to the IEEE 802.3 standard, encapsulating the intermediate data packet received.

In the second step of transmitting intermediate frames E30, the two frames in the typical standardized format are transmitted to another communicating device, respectively the second communicating device 200*b* if the step of generating intermediate frames E10 is carried out by the first communicating device 200a, or the first communicating device 200a if the step of generating intermediate frames E10 is carried out by the second communicating device 200b, via the inter-device link 404.

Particularly, in the case of the integrity capability, a low time lag on emission, that is to say a time lag of X bits between the transmission of the intermediate frames can globally improve the integrity and the availability. Indeed, the disturbance does not apply to the same position of a sequence of bits on each of the intermediate frames.

Each of the frames in the typical standardized format is emitted on a separate physical link.

The two frames in the typical standardized format can be transmitted simultaneously or with a small time lag, comprised in a given time window.

In the step of receiving intermediate frames E40, the two frames in the typical standardized format are received on the physical links of the second communicating device 200, respectively the second communicating device 200b if the step of generating intermediate frames E10 is carried out by the first communicating device 200a, or the first communicating device 200a if the step of generating intermediate frames E10 is carried out by the second communicating device 200b, via the inter-device link 404.

In the third step of transmitting intermediate frames E50, each media management module 221 of the communicating device 200 respectively transmits the intermediate packets extracted from the received intermediate frames to the transfer module 222 of the other communicating device 200, particularly the second module transfer 222b of the second communicating device 200b.

In the third step of transmitting intermediate frames E50, the transfer module 222 of the other communicating device 200 performs the verification of the integrity of the two intermediate packets received to reconstitute the source packet.

The third step of transmitting intermediate frames E50 may further comprise a correction of erroneous bits according to the type of code of a dedicated redundancy sequence.

In the third step of transmitting intermediate frames E50, in the case of enhanced integrity, on receipt of the first of the two intermediate packets, the transfer module 222 of the second communicating device 200 triggers a time window of predefined maximum duration, constituting a receiving delta T, in which the second of the two intermediate packets, that is to say the late frame, must be received.

If the second of the two intermediate packets is not received after the time window of predefined maximum duration has elapsed, the third step of transmitting intermediate frames E50 is not carried out and the source packet is not reconstituted.

The integrity verification function could include the correction of erroneous bits. As a result, it returns to awaiting receipt of the group of the following two intermediate packets.

Furthermore, in particular in the case of enhanced integrity, a comparison of the data of each intermediate packet is carried out, in the event of inconsistency, the integrity verification is not validated and the source packet is not reconstituted.

If the verification is validated, the data of the source packet are reconstituted from the data of the intermediate packets. The source packet is then transmitted to the higher protocol layers 210.

Preferably, at all the transmission steps of the methods described above, the frames can be received simultaneously or with a small time lag, comprised in a given time window.

The description which has just been made is such that the step of receiving source data E0 and the step of generating intermediate frames E10 are carried out by the first communicating device 200a. However, what has just been described can be mutually transposed in an analogous way if the step of receiving source data E0 and the step of generating intermediate frames E10 are carried out by the second communicating device 200b.

The disclosure has been described by considering the two-way data communication system 100 according to the specificities mentioned above. However, the disclosure is also likely to apply to part of the two-way data communication system 100.

Obviously, the disclosure is not limited to the embodiments described above and provided solely by way of example. It encompasses various modifications, alternative forms and other variants that those skilled in the art may envisage in the context of the disclosure and in particular all combinations of the different operating modes described above, which may be taken separately or in combination.

The invention claimed is:

1. A two-way data communication method of a two-way data communication system, the two-way data communication method comprising:

receiving source data, wherein a first packet management module of a first communicating device, configured to implement a single pair Ethernet protocol, respectively a second packet management module of a second communicating device, configured to implement a single pair Ethernet protocol, receives a source packet comprising N bits to be transmitted to the second communicating device, respectively to the first communicating device;

generating intermediate frames, wherein the first packet management module of the first communicating device, respectively the second packet management module of the second communicating device, generates:

a first intermediate frame comprising M data bits as a function of N bits of the source packet to be transmitted, and a second intermediate frame comprising P data bits as a function of the N bits of the source packet to be transmitted;

transmitting intermediate frames, wherein:

a first physical link management module of the first communicating device, respectively of the second communicating device, transmits the first intermediate frame on a first connector-module link, and a second physical link management module of the first communicating device, respectively of the second communicating device, transmits the second intermediate frame on a second connector-module link, the first physical link management module and the second physical link management module being linked by separate single pair link;

receiving intermediate frames, wherein:

the first physical link management module of the second communicating device, respectively of the first communicating device, receives the first intermediate frame on a first connector-module link, and the second physical link management module of the second communicating device, respectively of the first communicating device, receives the second intermediate frame on a second connector-module link;

transmitting intermediate frames, wherein the first intermediate frame and the second intermediate frame are transmitted to the second packet management module of the second communicating device, respectively to the first packet management module of the first communicating device; and reconstituting source data, in which the second packet management module of the second communicating device, respectively the first packet management module of the first communicating device, reconstitutes the N data bits of the source packet as a function of the M data bits of the first intermediate frame and of the P data bits of the second intermediate frame.

2. The two-way communication method according to claim 1, wherein the M data bits of the first intermediate frame and the P data bits of the second intermediate frame are comprised between 1 and N, N being the number of bits of the source packet.

3. The two-way communication method according to claim 2, wherein the M data bits of the first intermediate frame and the P data bits of the second intermediate frame are equal to N or N/2.

4. The two-way communication method according to claim 2, wherein the M data bits of the first intermediate frame and the P data bits of the second intermediate frame are comprised between 1 and N/2.

5. The two-way communication method according to claim 1, wherein, in the reconstitution of source data, the second packet management module of the second communicating device, respectively the first packet management module of the first communicating device, performs a processing of a verification-field of the first intermediate frame and of the second intermediate frame, wherein the verification-field is a Cyclic Redundancy Check (CRC) field and is calculated on all the bits of the first intermediate frame and the second intermediate frame;

wherein the method further comprises verifying the transmission integrity by a check of the verification-field of the first intermediate frame and of the second intermediate frame; and wherein the reconstitution of the source data is validated only if the verification of the transmission integrity is positive.

6. The two-way communication method according to claim 5, wherein, in the reconstitution step, the second packet management module of the second communicating device, respectively the first packet management module of the first communicating device, performs the comparison of the data bits of the first intermediate frame and of the second intermediate frame, and wherein the reconstitution of the source data is validated only if the comparison of the data bits of the first intermediate frame and of the second intermediate frame is consistent.

7. The two-way communication method according to claim 1, wherein:

receiving the source data includes:

encapsulating the source packet in a source frame by at least a first media management module of the first communicating device, respectively at least a second media management module of the second communicating device, and generating the first intermediate frame and of the second intermediate frame as a function of the source frame by at least a first two-way transfer module of the first communicating device, respectively by at least a second transfer module of the at least communicating device;

reconstituting source data includes the reconstitution of the source frame by the at least second transfer module of the second communicating device, respectively by at least a first transfer module of the first communicating device; and transmitting the source frame to at least a second media management module of the second communicating device, respectively, to at least a first media management module of the at least first communicating device.

8. The two-way communication method according to claim 1, wherein, in the reception of the intermediate frames, reconstitution is triggered only if the two frames are received by the first physical link management module and the second physical link management module of the second communicating device, respectively by the first physical link management module and the second physical link management module of the at least first communicating device, in a time window of predefined maximum duration.

9. The two-way communication method according to claim 1, wherein:

receiving the source data includes:

generating, by a first transfer module of the at least first communicating device, respectively by a second transfer module of the second communicating device:

a first intermediate data packet comprising M data bits extracted from the N bits of the source packet, and, a second intermediate data packet comprising P data bits extracted from the N bits of the source packet, and encapsulating the first intermediate packet in the first intermediate frame by a first media management modules of the at least first communicating device, respectively by a second media management modules of the second device communicating, and encapsulating the second intermediate packet in the second intermediate frame by another first media management module of the at least first communicating device, respectively by another second media management module of the second communicating device; and wherein reconstituting the source data includes, by the first transfer module and the second transfer module, receipt of the first intermediate packet and of the second intermediate data packet respectively extracted from the first and the second intermediate frame, and reconstitution of the source packet as a function of the first and of the second intermediate data packet.

10. The two-way communication method according to claim 9, wherein, in the reception of each of the intermediate packets by the second transfer module of the second communicating device, respectively by the first transfer module of the at least first communicating device, the reconstitution is triggered only if the two intermediate packets are received within a time window of predefined maximum duration.

11. An embedded two-way communication system, comprising:

at least a first communicating device configured to implement a single pair Ethernet protocol and comprising a first packet management module connected to a first physical link management module and to a second physical link management module, the first physical link management module and the second physical link management module being linked by a separate single pair link to a first common connector of the first communicating device, and a second communicating device configured to implement a single pair Ethernet protocol and comprising a second packet management module connected to a first physical link management module and to a second physical link management module, the first physical link management module and the second physical link management module being linked by a separate single pair link to a second common connector of the second communicating device, the first connector of the first communicating device being linked to the second connector of the second communicating device by an inter-device link, in particular a two pair link, wherein the least one first communicating device and the second communicating device are configured for the implementation of the two-way data communication method according to claim 1.

12. The two-way data communication method according to claim 1, wherein intermediate frames are generated from each source packet or source frame.

* * * * *